United States Patent [19]

Wakabayashi

[11] Patent Number: 4,688,921
[45] Date of Patent: Aug. 25, 1987

[54] ALARM DEVICE FOR CAMERA

[75] Inventor: Tsutomu Wakabayashi, Tokyo, Japan

[73] Assignee: Nippon Kogaku K. K., Tokyo, Japan

[21] Appl. No.: 894,959

[22] Filed: Aug. 8, 1986

[30] Foreign Application Priority Data

Aug. 13, 1985 [JP] Japan .................................. 60-178414

[51] Int. Cl.$^4$ ........................ G03B 15/05; G03B 17/18
[52] U.S. Cl. .................................... 354/416; 354/442;
354/474; 354/475; 354/127.1; 354/286;
354/289.1; 354/471
[58] Field of Search ............... 354/441, 442, 443, 444,
354/445, 412, 416, 417, 145.1, 127.1, 127.11,
127.12, 471, 473, 474, 475, 286, 289.1, 289.11,
289.12, 21

[56] References Cited

U.S. PATENT DOCUMENTS

| | | | |
|---|---|---|---|
| 4,130,358 | 12/1978 | Lang et al. | 354/289.12 |
| 4,199,236 | 4/1980 | Goto et al. | 354/471 |
| 4,269,497 | 5/1981 | Ishizaka et al. | 354/286 |
| 4,275,953 | 6/1981 | Watanabe et al. | 354/286 |
| 4,299,463 | 11/1981 | Kawamura et al. | 354/127.12 |
| 4,343,545 | 8/1982 | Onogi | 354/289.12 |
| 4,370,042 | 1/1983 | Ohkubo | 354/127.11 |
| 4,582,412 | 4/1986 | Wakabayashi | 354/442 |
| 4,624,540 | 11/1986 | Ishizaka et al. | 354/21 |
| 4,636,055 | 1/1987 | Alyfuku | 354/127.12 |

Primary Examiner—Russell E. Adams
Attorney, Agent, or Firm—Shapiro and Shapiro

[57] ABSTRACT

An alarm device for a camera provided with a stop control device for automatically controlling the stop of an objective lens mounted on the camera, and a photosensor for receiving an illumination light which has been radiated from a flash device to be electrically connected to the camera, reflected from an object and passed through the stop, the output of the photosensor being used for control of the light emission quantity of the flash device, includes: a lens discriminating unit for discriminating the type of the objective lens and outputting a first signal when an objective lens not suitable for an automatic stop control by the stop control device is mounted on the camera; a flash device detecting unit for generating a second signal upon detecting that the flash device is electrically connected to the camera and a flash light is permitted to be radiated; a judging unit including a unit for presetting a stop value of the objective lens and a unit for setting beforehand a limit stop value for a flash photography, the judging unit generating a third signal when the preset stop value exceeds the limit stop value; and an alarm unit for giving an alarm signal when the first, second and third signals are all generated.

6 Claims, 5 Drawing Figures

ALARM DEVICE FOR CAMERA

BACKGROUND OF THE INVENTION

1. Field of the Invention

The present invention relates to a device for alarming a stop setting error of a camera using an automatic stop uncontrollable lens during a flash photography under a TTL light emission control.

2. Related Background Art

Conventionally, an automatic stop controllable lens or an automatic stop uncontrollable lens has been used for a camera.

The automatic stop controllable lens has a correspondence between the position of a stop lever of the camera and the stop step number of the lens, while the automatic stop uncontrollable lens has no correspondence between the position of the stop lever and the stop step number. With a conventional camera, a discrimination between the automatic stop controllable lens and the automatic stop uncontrollable lens is made so that an automatic stop control of the uncontrollable lens is inhibited by the camera.

Of conventional cameras, there is known a camera of the type performing a flash photography under a TTL light emission control, wherein mounting of a stop controllable lens and a flash device is detected and setting of a stop control mode is detected, whereby a shutter speed is automatically set at a certain second suitable for the flash photography when mounting a flash device is detected, and the lens stop value is automatically controlled by the camera to set it at a value predetermined by the film sensitivity or the like.

In case where a flash photography under a TTL light emission control is performed using a camera mounted with a stop uncontrollable lens, it is common that a small stop diameter such as a minimum stop is set beforehand by the stop ring of the camera lens in a stop control mode. Therefore, a stop control of the stop uncontrollable lens is not effected by the camera and the stop remains unchanged to take the small stop diameter set by the stop ring.

Since the guide number (light emission quantity) of a flash device has a limit even with a flash photography under a TTL light emission control, there arises a problem of insufficient light quantity.

SUMMARY OF THE INVENTION

The present invention has been made in view of the above problem, and it is an object of the present invention to provide a device for alarming a stop setting error of a camera using an automatic stop uncontrollable lens and preventing taking a poor photography during a flash photography under a TTL light emission control.

To achieve the above object, the alarm device of the present invention is constructed such that in case where a flash photography under a TTL light emission control is to be performed using a stop uncontrollable lens and a stop control is to be made, an alarm is given after judging that a stop value set by the lens is smaller than the stop diameter corresponding to the limit stop value set by the camera.

DETAILED DESCRIPTION OF THE PREFERRED EMBODIMENTS

Figure 1:
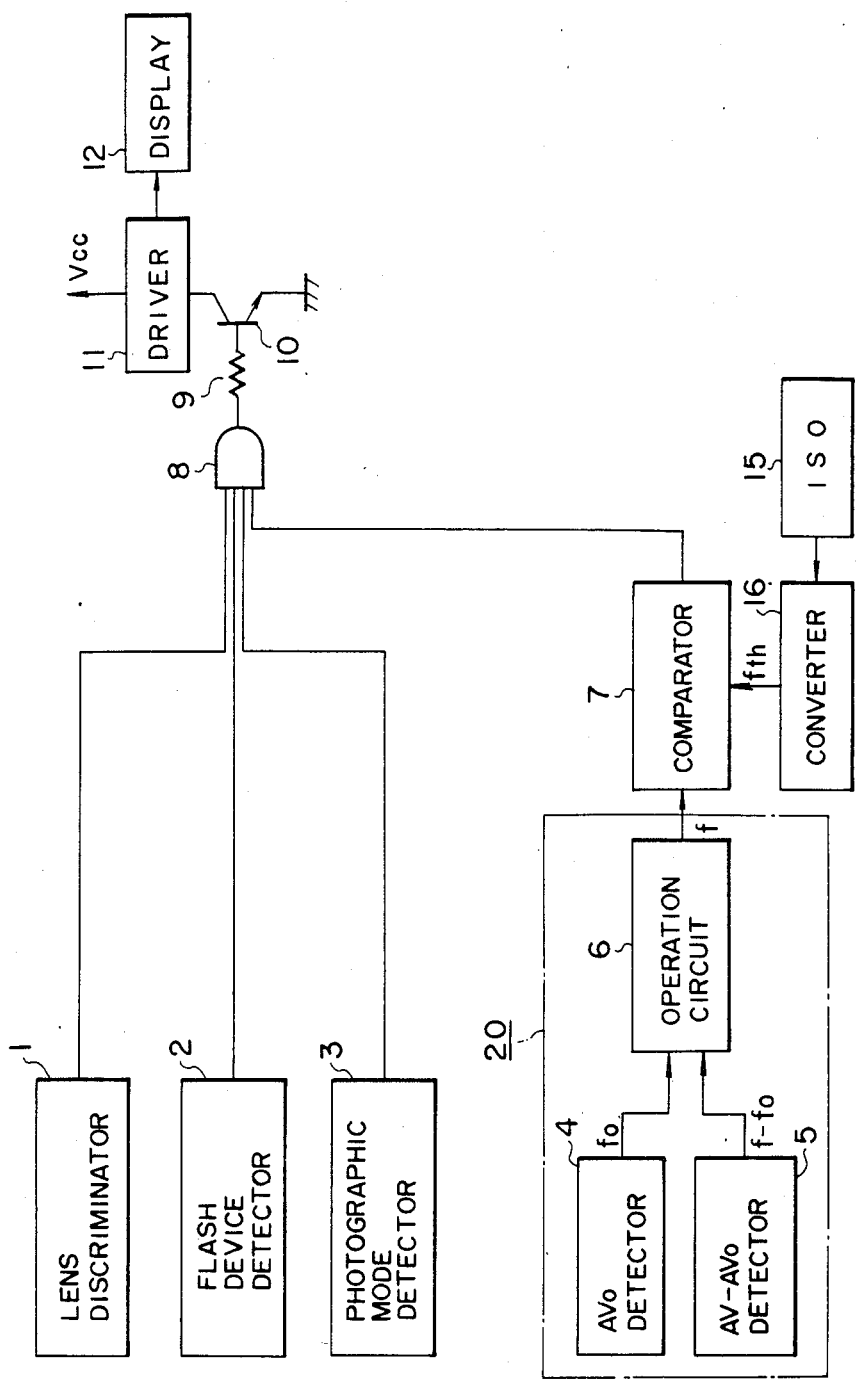
FIG. 1 is a block diagram showing the circuit arrangement of the alarm device according to an embodiment of the present invention.

FIG. 1 is a block diagram of the circuit arrangement of the alarm device according to an embodiment of the present invention.

First, the construction of the alarm device will be described. In the figure, a lens discriminator 1 discriminates mounting of an automatic stop controllable lens and an automatic stop uncontrollable lens and outputs an H level signal when the latter mounting is detected. Particularly, as disclosed in U.S. Pat. No. 4,269,497, a pin is provided on the body of a camera which pin can be fittingly inserted into a dent formed in the mounting plane of an automatic stop controllable lens. A switch is provided in the camera which switch opens when the pin cannot be inserted in the dent of the lens mounting plane when the lens is mounted in the camera (in other words, when a dent is not formed in the lens mounting plane), and closes when the pin can be inserted into the dent (in other words, when a dent is formed on the lens mounting plane). Since the dent is not formed in the mounting plane of the automatic stop uncontrollable lens mounting plane, the switch is made opened and the mounting of an automatic stop uncontrollable lens is detected to output an H level signal.

A flash device detector 2 outputs an H level signal when a flash device having a TTL light emission control function is mounted on the camera and a flash power source is turned on. The detector 2 may detect a charge completion of the flash device in stead of detecting turning-on of the flash power source.

A photographic mode detector 3 outputs an H level signal upon detection of a choice of a stop controlling exposure mode. Particularly, the detector 3 outputs an H level signal when a choice of either a shutter speed priority exposure control mode or a programmed exposure control mode is detected. An L level signal is outputted therefrom in case of a stop priority exposure control mode or a manual exposure control mode.

A calculator 20 comprises an $AV_0$ detector 4 for detecting an open stop value of the lens an $AV-AV_0$ detector 5 for detecting a stop step number of the stop ring, and an operation circuit 6.

The $AV_0$ detector 4 detects an open stop value which is supplied to the camera when a lens is mounted on the camera and converts it into an open stop value signal $f_0$ and outputs it. The $AV-AV_0$ detector 5 detects how many steps the stop value set by the lens stop ring is more closed than the open stop value, and converts it into a stop step number signal $(f-f_0)$ and outputs it.

The operation circuit 6 calculates a stop value set by the stop ring based on the open stop value signal $f_0$ from the $AV_0$ detector 4 and the stop step number signal $(f-f_0)$ from the $AV-AV_0$ detector 5, and the calculate result is outputted as a setting stop value signal f.

A film sensitivity detector circuit ISO 15 outputs a signal from a film sensitivity setting dial of the camera or a signal from a detector which detects film sensitivity information provided on the film cartridge loaded in the camera. A converter 16 outputs a signal f-th corresponding to a limit stop value decided by the film sensitivity obtained from the detector circuit 15. A comparator 7 compares the signal f-th with the signal f corresponding to the stop value set by the stop ring of the lens. In case of f>f-th (i.e., the set stop value is smaller than the limit stop diameter), the comparator outputs an H level signal. Alternatively, in case of f≦f-th i.e., the set stop value is larger than or equal to the limit stop diameter), the comparator outputs an L level signal.

Conversion into the limit stop value signal f-th is performed as in the following in this embodiment. Assuming that a guide number of the flash device is 25 to 30, and distance to an object is about 5 meters, an appropriate stop value for a flash photography becomes about F 5.6. Therefore, the converter 16 generates a signal corresponding to F 5.6 when the film sensitivity is ISO 100. In case of a higher film sensitivity than ISO 100, a signal corresponding to a stop value closed more than F 5.6 is generated. In case of a lower film sensitivity than ISO 100, a signal corresponding to a stop value opened more than F 5.6 is generated. More in particular, in case where a film sensitivity of ISO 20 is obtained from the detector 15, a signal f-th corresponding to F8 is generated. A signal f-th corresponding to F11 in case of ISO 400, a signal f-th corresponding to F11 in case of ISO 400, a signal f-th corresponding to F4 in case of ISO 50, a signal f-th corresponding to F2.8 in case of ISO 25, are respectively generated. The converter 16 can readily obtain such conversion data previously stored in a ROM under control of a microcomputer.

An AND gate 8 is inputted with the outputs from the lens discriminator 1, flash device detector 2, photographic mode detector 3 and comparator 7 to perform a logical AND operation. The output of the AND gate 8 is coupled to the base of a transistor 10 via a resistor 9, the transistor 10 having as its collector load a display driver 11.

The display driver 11 is supplied with a power Vcc when the transistor 10 turns on, thereby driving a display 12 and giving an alarm display indicating an improper stop setting. These AND gate 8 resistor 9, transistor 10 and display driver 11 constitute the alarm device of the present invetion.

Figure 2A:
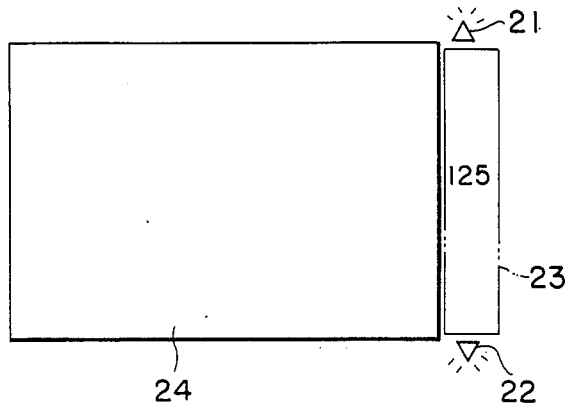
FIGS. 2A and 2B show examples of alarm displays in the finder of camera.
Figure 2B:
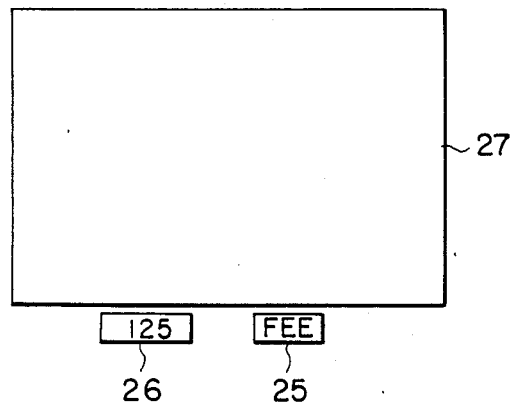

FIGS. 2A and 2B show examples of alarm displays on the finder by means of the display 12 of FIG. 1.

FIG. 2A shows an example of an alarm display on the finder wherein only a shutter speed is displayed, and representations 21 and 22 provided over and under a shutter speed display area 23 allocated on the right side of a view field 24 are alternately flashed at a predetermined period to thereby display an alarm indicating a stop setting error.

FIG. 2B shows an alarm display on the finder wherein both shutter speed and stop value are displayed respectively on a sutter speed display area 26 allocated under a view field 27 and on a stop value display area 25 allocated on the right side of the area 26. An alarm display "FEE" is performed on the stop value display area 25 when a stop value setting error is judged.

Next, the operation of the embodiment of FIG. 1 will be described.

First, when an automatic stop controllable lens is mounted on a camera body, the lens discriminator 1 outputs an L level signal so that at least one of the inputs to the AND gate 8 becomes of an L level. Therefore, the output from the AND gate 8 is retained of an L level which causes the transistor to turn off and an alarm display by the display 12 is not performed.

As to the shutter speed, when mounting a flash device is detected, a shutter speed is automatically set at a certain second suitable for a flash photography by means of a not-shown circuit. Further, as to a stop value, a stop control circuit (not shown) is actuated in response to a shutter release to perform an automatic stop diameter control whereby the diameter is set at a value calculated by the camera, such as a value decided based on a film sensitivity for example. A flash photography under a TTL light emission control is effected under the above control operation.

Alternatively, when mounting of an automatic stop uncontrollable lens is detected, the lens discriminator 1 outputs an H level signal. In this case, assume that a flash device with a TTL light emission control function is mounted on the camera body and the flash device is powered, and that a shutter speed priority exposure control mode or a programmed exposure control mode is selected by the camera. Then, the outputs from the flash device detector 2 and the photographic mode detector 3 are of an H level. Thus, a condition for taking a flash photography under a TTL light emission control is judged based on the fact that all outputs from the lens discriminator 1 and detectors 2 and 3 are of an H level.

In case of an exposure mode which automatically controls the stop and outputs an H level signal from the photographic mode detector 3, for example, in case of a shutter speed priority exposure control mode or a programmed exposure control mode, it is a general principle that the stop value is set beforehand at a smaller stop diameter such as a minimum stop value. In such a case, an open stop value signal $f_0$ for the automatic stop uncontrollable lens is detected by the detector 4, and the stop step number signal $(f-f_0)$ of the lens is detected by the detector 5. These signals are supplied to the operation circuit 6 to calculate a lens stop value signal f set by the lens stop ring. As a result, since a stop control by the camera is not effected in case of mounting the automatic stop uncontrollable lens, a flash photography under a TTL light emission control is carried out when a shutter is released, with the small stop diameter such as the minimum stop value set by the stop ring being unchanged. Thus, an insufficient exposure occurs.

Accordingly, in this embodiment, the limit stop value signal f-th obtained from the converter 16 based on the film sensitivity detected by the film sensitivity detector circuit 15 is compared with the stop value signal f set by the stop ring. In case where the limit stop value signal f-th is smaller than the lens stop value signal f (i.e., the set stop diameter is equal to or larger than the limit stop diameter f≦f-th), the comparator output becomes of an L level. However, for example, in case where the limit stop value signal f-th for a film sensitivity of ISO 100 becomes a signal corresponding to F 5.6 and the lens stop value signal f becomes a signal corresponding to F11 (i.e., the set stop diameter is smaller than the limit stop diameter, f>f-th), the comparator output becomes of an H level.

Consequently, four inputs to the AND gate 8 become all H level to thereby output an H level signal therefrom. Thus, the transistor 10 turns on and the display driver 11 makes the display 12 indicate an alarm of a stop setting error.

That is, an alarm display indicating a stop setting error is performed either by alternately flashing the representations 21 and 22 at a predetermined period as shown in FIG. 2A or by displaying "FEE" indication as shown in FIG. 2B.

Upon occurrence of an alarm display indicating a stop setting error, the lens stop ring is rotated to a lens open side, e.g., the stop diameter is reset to a value corresponding to the limit stop value of F 5.6 for ISO 100 or to a stop value more opened than that (f≦f-th). Then the output of the comparator 7 changes to an L level to turn off the transistor 10 by an output from the AND gate 8. Thus, the alarm display on the finder conducted by the display 12 disappears.

Upon release of a shutter in this state, the shutter speed is controlled at a certain second suitable for a flash photography, and the stop value is controlled at the value set by the lens stop ring. Thus, it is possible to prevent an insufficient light quantity during a flash photography.

In stead of a visual alarm display as above, an audible alarm may be used driving such as a piezoelectric buzzer.

Figure 3:
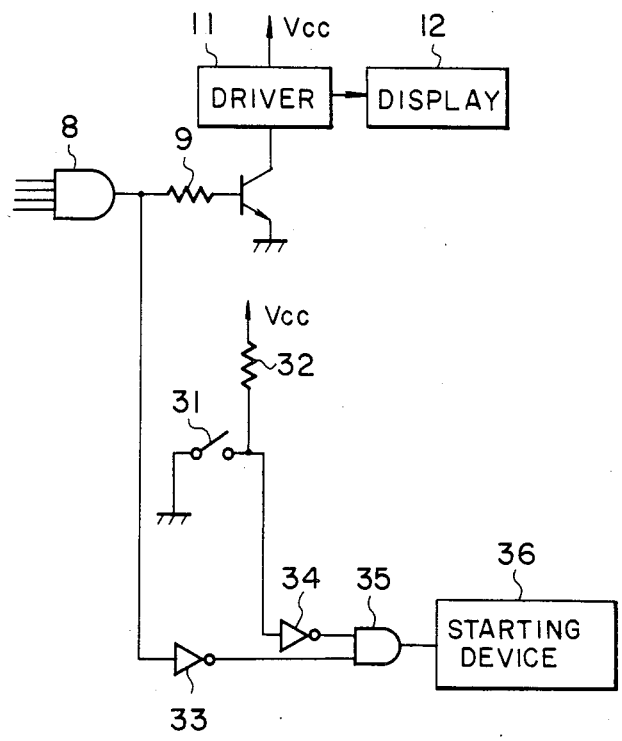
FIG. 3 is a block diagram showing the circuit arrangement of the alarm device according to a second embodiment of the present invention.

FIG. 3 is a block diagram showing the circuit arrangement of the alarm device according to a second embodiment of the present invention, wherein the input side of the AND gate 8 is the same with those of the first embodiment of FIG. 1 so it is omitted in FIG. 3. This embodiment features in that a shutter release is locked in response to an output of an H level signal from the AND gate 8 i.e., in response to an alarm display indicating a stop setting error.

A release switch 31 closes when an unrepresented release button in depressed. One terminal of the release switch 31 is pulled up by a resistor 32 to a voltage source Vcc, while the other terminal thereof is grounded. When the release switch 31 is closed, the resistor 32 is grounded so that an H level at the interconnection between the release switch 31 and the resistor 32 is changed to an L level. This L level signal is inverted by an inverter 34 and the inverted signal is supplied to one input of an AND gate 35. To the other input of the AND gate 35, the output of the AND gate 8 inverted by an inverter 33 is inputted. The output of the AND gate 35 is inputted to a starting device 36 made of, for example, a release magnet and a motor for starting the camera. The starting device 36 is made operative when an H level signal is supplied from the AND gate 35, and inoperative in case of an L level signal.

In operation of the embodiment shown in FIG. 3, an alarm display indicating a stop setting error is the same as with the embodiment shown in FIG. 2. When an H level signal is outputted from the AND gate 8 upon detection of a stop setting error, it is inverted by the inverter 33 to become of an L level which makes the AND gate 35 inhibited. Therefore, even if the release button is depressed during an alarm display indicating a stop setting error and the release switch 31 turns on to output an H level signal from the inverter 34, the starting device 36 will not operate due to the L level output of the AND gate 35 and hold a release lock state irrespective of a depression of the release button. On the other hand, if the lens stop ring is rotated, during an alarm display indicating a stop setting error, to a lens open side, e.g., if the stop value is reset at the limit stop value of F 5.6 for ISO 100 or at a value more opened than that (f≦f-th), the output from the AND gate 8 returns to an L level to thereby enable the AND gate 35 and release the release lock state.

Figure 4:
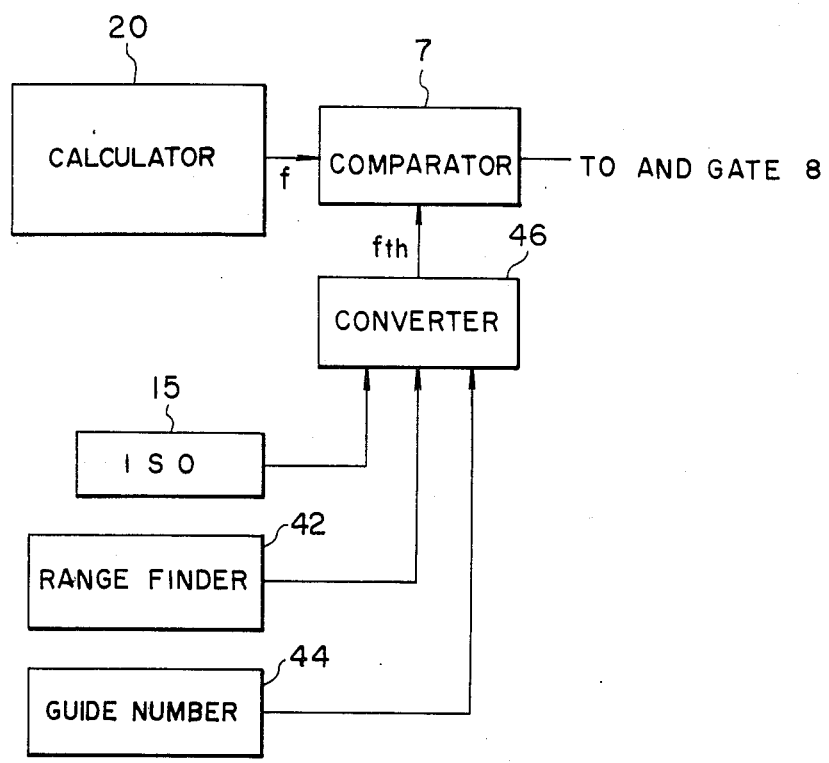
FIG. 4 is a block diagram showing an alteration of the converter of FIG. 1.

In the above embodiments, although the converter 16 is constructed to decide the limit stop value signal f-th based on the film sensitivity only, it may be constructed to decide the limit stop value signal f-th based on the object distance and/or the guide number of the flash device as well as the film sensitivity. In such a case, as shown in FIG. 4 the object distance may be information detected by a range finder 42 of an automatic focussing detector device or the like. A circuit 44 for generating guide number information may be mounted on a flash device for generating a signal corresponding to the guide number or may be mounted within the camera for manual control by the operator.

Further, the limit stop value signal f-th may be a fixed value, e.g., a signal corresponding to F 8 irrespective of the film sensitivity, distance and guide number of the flash device.

Furthermore, the limit stop value signal f-th decided by the film sensitivity may be a value within a limited range so that even if a film having a higher sensitivity than that exceeding the limited range is used, the limit stop value signal f-th remains within the limited range and does not change to a signal corresponding to the stop diameter smaller than the value within the limited range. Particularly, in case where a signal corresponding to F 11 for ISO 400 is adopted, this signal corresponding to F 11 may also be used even if a film having a higher sensitivity, e.g., ISO 800, ISO 1600 is used.

What is claimed is:

1. An alarm device for a camera provided with a stop control device for automatically controlling the stop of an objective lens mounted on the camera, and a photosensor for receiving an illumination light which has been radiated from a flash device electrically connected to the camera, reflected from an object and passed through the stop, the output of the photosensor being used for control of the light emission quantity of the flash device, comprising:

lens discriminating means for discriminating the type of said objective lens and outputting a first signal when an objective lens not suitable for an automatic stop control by said stop control device is mounted on the camera;

flash device detecting means for generating a second signal upon detecting that said flash device is electrically connected to the camera and a flash light is permitted to be radiated;

judging means including means for presetting a stop value of said objective lens and means for setting beforehand a limit stop value for a flash photography, said judging means generating a third signal when said preset stop value exceeds said limit stop value; and alarm means for giving an alarm signal when said first, second and third signals are all generated.

2. An alarm device for a camera according to claim 1, wherein said camera includes means for selecting a mode wherein an exposure is controlled by said stop control device; said alarm device further includes photographic mode detecting means for generating a fourth signal upon detecting that said mode has been selected by said mode selecting means; and wherein said alarm means generates said alarm signal when said first, second, third and fourth signals are all generated.

3. An alarm device for a camera according to claim 1, wherein said alarm means includes display means which is driven in response to said alarm signal.

4. An alarm device for a camera according to claim 1, wherein said alarm means includes means for inhibiting taking a photograph with said camera in response to said alarm signal.

5. An alarm device for a camera according to claim 1, wherein said limit stop value setting means sets said limit stop value based on the film sensitivity of a film loaded in said camera.

6. An alarm device for a camera according to claim 1, wherein said limit stop value setting means sets said limit stop value based on the film sensitivity of a film loaded in said camera, and at least one of a distance of an object and a guide number of said flash device.

* * * * *